UNITED STATES PATENT OFFICE.

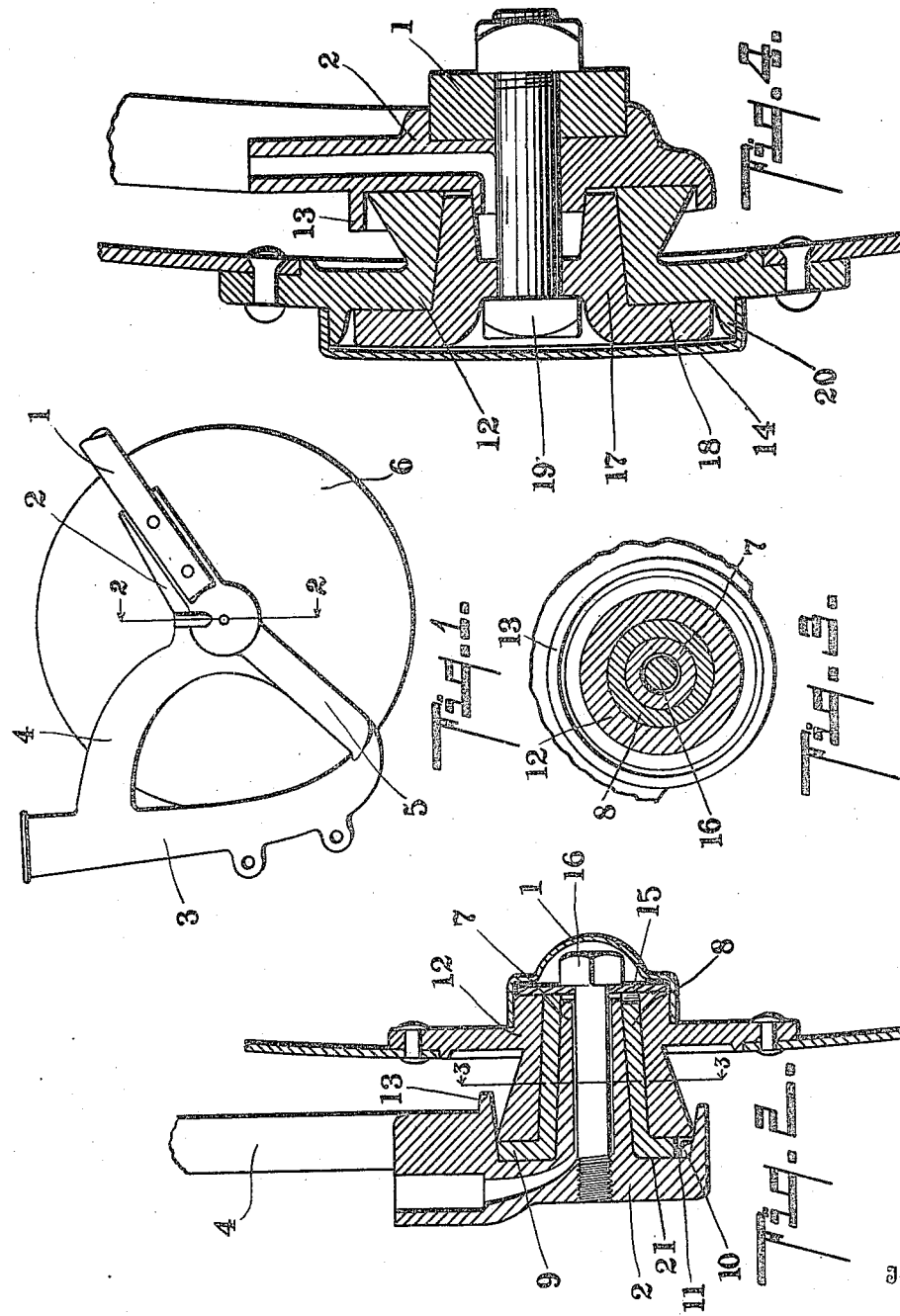

CHARLES L. FOWLE, OF DOWAGIAC, MICHIGAN, ASSIGNOR TO DOWAGIAC MANUFACTURING COMPANY, OF DOWAGIAC, MICHIGAN.

BEARING.

962,629.  Specification of Letters Patent.  Patented June 28, 1910.

Application filed March 4, 1908. Serial No. 419,155.

*To all whom it may concern:*

Be it known that I, CHARLES L. FOWLE, a citizen of the United States, residing at Dowagiac, Michigan, have invented certain new and useful Improvements in Bearings, of which the following is a specification.

This invention relates to improvements in bearings.

My improved bearing is especially adapted and designed by me as a bearing for disk furrow openers for grain drills, and is especially advantageous for use in that relation, although it could be adapted for use in other relations, such as disk harrows, and the like.

The main object of my invention is to provide an improved bearing of the class described which is very effectively protected from dirt, and, at the same time, is comparatively economical in structure and easily assembled or disassembled, and one which is very durable in use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a detail side elevation of a section of a grain drill embodying the features of my invention. Fig. 2 is an enlarged detail vertical section taken on a line corresponding to line 2—2 of Fig. 1. Fig. 3 is a detail section taken on a line corresponding to line 3—3 of Fig. 2. Fig. 4 is a detail vertical section corresponding to the section shown in Fig. 2 of a modified construction of my invention.

In the drawings, similar reference characters refer to similar parts throughout the several views, and the sectional views are taken looking in the direction of the little arrows at the ends of the section lines.

Referring to the drawing, 1 represents the draw-bar of a grain drill section, or furrow opener, 2 the bearing support. The boot 3 is connected to the bearing support by means of the bracket-like arms 4 and 5, the arm 5 being preferably adapted to serve as a scraper for the disk 6. The disk 6 is preferably of the concavo-convex type and is, in use, usually set at an angle to the line of draft whereby it more effectively opens the furrow for the seed which is distributed through the boot. However, these devices form no part of this invention and are not illustrated in detail herein.

The support 2 is provided with a laterally-projecting bearing stud or shank 7. On this bearing stud or shank I preferably arrange a bearing sleeve 8, having an outwardly-projecting flange 9 at its inner end. This sleeve is preferably held against revolution on the spindle by means of the lug 10, which engages a suitable notch, as 11, in the sleeve. The hub 12 of the disk is flared inwardly, or is made cone shaped, the base of the cone being at the inner end of the hub. The flange 9 of the bearing sleeve is preferably adapted to serve as a bearing for the inner end of the hub, as clearly appears from the drawing.

The bearing support 2 is provided with a recess or seat 21 to receive the end of the bearing sleeve and the under end of the hub, and is preferably provided with a projecting dust-flange 13. It is obvious that either the dust-flange or recess might be so formed as to afford sufficient protection for the inner end of the hub, and I therefore use the term dust-guard in the claims in referring to these parts. By thus flaring the hub, any dust or dirt that may fall thereon is carried away from the inner end of the hub and thus away from the entrance to the bearing. It will be readily understood that inasmuch as these furrow openers or harrow disks and the like are concavo-convex and also usually set at an angle, and further are frequently operated in wet and sticky soils, they carry up earth and dust which falls onto the hubs and works into the bearings, resulting in serious injury thereto unless the same is properly constructed and protected. By this simple means, I secure an effective protection for the bearing from the dirt.

The outer end of the bearing is protected by a cap 14, which is preferably arranged to embrace the outer end of the hub, and may be secured thereon in any suitable manner, as by threads, set screws, or the like, but I prefer to make the same of sheet metal stamped to fit the hub, so that it is retained by being merely pressed thereon. The hub is retained upon the bearing in the construction shown in Figs. 1, 2 and 3, by means of the washer 15, which is clamped against the end of the bearing sleeve by means of the bolt 16, which is preferably threaded into the support, as illustrated.

In the modified construction shown in Fig. 4, a modified form of bearing block is provided, and the hub is also modified slightly to adapt it to this special bearing block. The hub, however, has the same flared end as shown in Figs. 1, 2 and 3. In this construction, the bearing block 17 is formed separately from the support and secured by means of the bolt 19 provided with a flange or plate-like bearing portion 18 at its outer end, which bears against the outer end or face of the disk hub 12. The bushing or bearing sleeve is omitted in this construction. The retaining washer 15 is also omitted, as the flange portion 18 of the bearing block or spindle serves to retain the hub. The bearing block itself is as above stated here held in place by the retaining bolt 19, which also serves to assist in securing the draw-bar to the support. The bearing cap 14 in this modification is arranged on an annular flange 20 on the hub so that it incloses the outer end of the bearing block, fully protecting the same from dust and dirt.

I have illustrated and described my improved bearing in detail in the forms preferred by me, although I am aware it is capable of other modifications in structural details, without departing from my invention, but as such modifications will, it is believed, be obvious to those skilled in the art to which this relates, they are not here illustrated.

Having thus described my invention, what I claim as new and desire to secure by Letters Patent, is:

1. In a bearing, the combination with a support, having a dust guard thereon; a bearing stud on said support; a bearing sleeve for said bearing stud having an outwardly-projecting flange at its inner end; a disk; a hub flared toward its inner end, said flange on said bearing sleeve being arranged to serve as a bearing for the inner end of said hub, said flared end of said hub being arranged to project into said dust guard on said support, whereby the bearing joint is covered and the dust or dirt falling upon the hub is deflected thereby away from the inner end of the hub; a retaining washer for said hub; a retaining bolt therefor; and a cap for the outer end of said hub adapted to embrace said retaining washer and bolt.

2. In a bearing, the combination with a support, having a dust guard thereon; a bearing stud on said support; a disk; a hub flared toward its inner end, said flared end being adapted to form a thrust bearing member, said flared end being arranged to project into said dust guard on said support whereby the bearing joint at the inner end of said hub is covered and the dust or dirt falling on said hub is deflected away from the bearing joint; a thrust bearing member on said support adapted to coact with said thrust bearing member of said hub; a retaining washer for said hub; a retaining bolt therefor; and a cap for the outer end of said hub adapted to embrace said retaining washer and bolt.

3. In a bearing, the combination with a support, having a dust guard thereon; a bearing stud on said support; a disk; a hub flared toward its inner end, said flared end being arranged to project into said dust guard on said support whereby the bearing joint at the inner end of said hub is covered and the dust or dirt falling on said hub is deflected away from the bearing joint; and a retaining washer for said hub; a retaining bolt therefor; and a cap for the outer end of said hub adapted to embrace said retaining washer and bolt.

4. In a bearing, the combination with a support, having a dust guard thereon; a bearing stud on said support; a disk; a hub flared toward its inner end, said flared end being arranged to project into said dust guard on said support whereby the bearing joint at the inner end of said hub is covered and the dust or dirt falling on said hub is deflected away from the bearing joint; a retaining bolt for said hub, and a cap arranged on the outer end of said hub to embrace and inclose said retaining bolt and to close the outer end of said hub.

In witness whereof, I have hereunto set my hand and seal in the presence of two witnesses.

CHARLES L. FOWLE. [L. S.]

Witnesses:
EVA BURK,
EDWARD S. MCMASTER.